(12) United States Patent
Jodet et al.

(10) Patent No.: US 12,173,652 B2
(45) Date of Patent: Dec. 24, 2024

(54) ACOUSTIC MANAGEMENT, ON A TURBOMACHINE OR A NACELLE

(71) Applicant: SAFRAN AIRCRAFT ENGINES, Paris (FR)

(72) Inventors: Norman Bruno André Jodet, Moissy-Cramayel (FR); Jean-Michel Boiteux, Moissy-Cramayel (FR); Francis Couillard, Moissy-Cramayel (FR); Jérémy Paul Francisco Gonzalez, Moissy-Cramayel (FR); Stéphane Orcel, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 762 days.

(21) Appl. No.: 17/278,576

(22) PCT Filed: Sep. 20, 2019

(86) PCT No.: PCT/FR2019/052209
§ 371 (c)(1),
(2) Date: Aug. 18, 2021

(87) PCT Pub. No.: WO2020/058651
PCT Pub. Date: Mar. 26, 2020

(65) Prior Publication Data
US 2022/0018283 A1    Jan. 20, 2022

(30) Foreign Application Priority Data

Sep. 20, 2018  (FR) ........................ 1858549
Sep. 20, 2018  (FR) ........................ 1858550

(51) Int. Cl.
*F02C 7/045*   (2006.01)
*F01D 25/24*   (2006.01)

(52) U.S. Cl.
CPC .......... *F02C 7/045* (2013.01); *F05D 2230/60* (2013.01)

(58) Field of Classification Search
CPC ........ F02C 7/045; F02C 7/04; F05D 2230/60; F01D 25/24; F01D 25/246; F01D 25/28;
(Continued)

(56) References Cited

U.S. PATENT DOCUMENTS

| 4,104,002 A | * | 8/1978 | Ehrich ................... F02C 7/045 |
| | | | 137/15.1 |
| 5,336,044 A | * | 8/1994 | Forrester ............... F01D 21/045 |
| | | | 415/196 |

(Continued)

FOREIGN PATENT DOCUMENTS

| EP | 3 372 805 A1 | 9/2018 |
| FR | 3 039 517 A1 | 2/2017 |

(Continued)

OTHER PUBLICATIONS

International Patent Application No. PCT/FR2019/052209, International Search Report and Written Opinion dated Jan. 15, 2020, 13 pgs.

*Primary Examiner* — Woody A Lee, Jr.
*Assistant Examiner* — Joshua R Beebe
(74) *Attorney, Agent, or Firm* — Cozen O'Connor (57) ABSTRACT

The invention relates to acoustic management, on an aircraft turbomachine or on a nacelle, via a panel (30,32). On a support (38) is reserved a recess (34), recessed with respect to a surrounding general surface (36) for contact with moving air. The recess (34) is adapted to receive the panel, as another so-called surface for contact with moving air. The support (38) and/or the panel comprise removable connecting elements for, in the recess, mounting the panel remov- (Continued)

ably with respect to the support, the panel being an acoustic panel (30) or a non-acoustic panel (32).

15 Claims, 5 Drawing Sheets

(58) Field of Classification Search
CPC .......... F01D 5/147; F01D 5/14; B64D 33/06; B64D 2033/0206
See application file for complete search history.

(56) References Cited

U.S. PATENT DOCUMENTS

| | | | |
|---|---|---|---|
| 8,959,768 B2 | 2/2015 | Vauchel et al. | |
| 10,940,955 B2* | 3/2021 | Lacko | F02K 1/827 |
| 2011/0192205 A1* | 8/2011 | Ganesh | B24C 1/10 |
| | | | 72/53 |
| 2013/0136577 A1* | 5/2013 | Evans | F04D 29/526 |
| | | | 415/121.2 |
| 2014/0321999 A1 | 10/2014 | Guilbert et al. | |
| 2015/0114005 A1* | 4/2015 | Hicklin | F01D 11/005 |
| | | | 264/261 |
| 2018/0223733 A1* | 8/2018 | Zhang | F02C 7/045 |
| 2018/0245516 A1* | 8/2018 | Howarth | B32B 27/06 |

FOREIGN PATENT DOCUMENTS

| | | |
|---|---|---|
| GB | 1 543 312 A | 4/1979 |
| WO | WO 2013/156739 A1 | 10/2013 |

\* cited by examiner

ACOUSTIC MANAGEMENT, ON A TURBOMACHINE OR A NACELLE

CROSS-REFERENCE TO RELATED APPLICATIONS

This application is a 35 U.S.C. § 371 filing of International Application No. PCT/FR2019/052209 filed Sep. 20, 2019, which claims the benefit of priority to French Patent Application No. 1858549 filed Sep. 20, 2018 and French Patent Application No. 1858550 filed Sep. 20, 2018, each of which is incorporated herein by reference in its entirety.

BACKGROUND/SUMMARY OF THE INVENTION

The present invention concerns the optimisation of an acoustic compromise on aircraft engines.

The implementation of acoustic panels in aircraft turbomachines, in particular aircraft engines, is, in part, justified by constraints associated with flight limitation policies at airports. These constraints are expressed in particular in terms of noise charges (financial charges applied to airlines for each use of an airport). These noise loads are at the discretion of each airport, which shall determine, in consultation with the users, the load structure to be applied locally.

It is therefore understandable that noise-reduction technologies can be of varying degrees of interest. This is why it is interesting to optimise the noise level of turbomachines taking into account the objectives of the users. This optimisation of the acoustic compromise can be passed on to reinforce other functionalities of the turbomachine (more efficient or more effective as regards the environment). Furthermore, it is noted that the attenuation levels obtained by some acoustic panels are not always perceptible to the human ear, even if they are clearly demonstrated by measurement.

It is therefore sought here to optimise the ability to adapt the level of noise-reduction technology of a product (acoustic panels) depending on the needs of users. In addition, it is sought here to manage the acoustic problems mentioned above as finely as possible.

In particular, for these purposes, it is proposed here a method for the preparation of a support area and for acoustic management:
  on an aircraft turbomachine comprising an air inlet cone, and/or
  on a nacelle of such a turbomachine comprising:
    at least one outer structure comprising at least one outer annular casing, and possibly:
    an inner structure comprising a fairing of a turbojet engine, which turbojet engine comprises a fan comprising said air inlet cone, the inner structure of the nacelle then defining, with the outer structure, an annular air vein of secondary (cold) air, and
    an exhaust nozzle comprising an outer primary nozzle sleeve and an inner primary nozzle tip defining between them an outlet channel for a primary air flow (hot) exiting the turbojet engine,
in which method:
  on at least said support area of the turbomachine or of the nacelle is reserved at least one recess, recessed with respect to a surrounding general surface of said support defining a surface for contact with moving air:
    in the turbomachine, on the air inlet cone, or
    on the nacelle,
  the recess being adapted to removably receive, and at least an acoustic panel and at least an non-acoustic panel, having a surface for contact with moving air, one replacing the other,
    depending on an acoustic or an aerodynamic criterion, one said panel is removed from the recess in which said panel was contained and replaced by a replacement panel adapted thereto and which therefore has a said surface for contact with moving air, said replacement panel thus being an acoustic panel if the panel removed is non-acoustic, and vice-versa.

In order to adapt the noise loads and to favour the versatility of the solutions in this framework and thus to best adapt the compromises between acoustic and aerodynamic imperatives, a proposed solution is that:
  a) the recess is left without any said panel placed therein, or
  b) the recess being without any said panel placed therein, a said panel is placed therein, or
  c) with a said panel placed in the recess, the panel is removed and the recess is left without any said panel placed therein.

Another technical difficulty has been identified: how to minimize the aerodynamic penalty caused by the depth of the recess?

Although the implementation of a said support for the turbomachine or nacelle with a "continuous" line location (without marked angles, at least at the upstream and downstream ends, in the direction of flow of said moving air) associated with the design of a panel of suitable shape will improve the situation, a solution with removable seals may be preferred, allowing the efficiency of said optional panels to be maximised.

It is therefore also proposed that:
  either, in case a) or c), removable aerodynamic smoothing elements with oblique and/or inflection point surfaces are placed in the recess, or side walls of the recess and of the panel are shaped, with at least one inflection point;
  or in case b):
    the recess being without any said panel placed therein, removable aerodynamic smoothing elements having oblique and/or inflection point surfaces are arranged therein, and
    subsequently, before placing a said panel therein, the removable aerodynamic smoothing elements are removed and then a said panel is placed therein.

With such removable aerodynamic smoothing elements, it must be possible to maximise the volume available for optional panels.

In order to adjust aerodynamic constraints, one can intelligently choose:
  that the replacement panel is manufactured with a solid surface for contact with the moving air with a roughness of less than 0.5 μm,
  that a linking edge of the replacement panel, by which the panel is joined with the surrounding general surface of said support, is shaped with a notch, and,
  that the replacement panel is removably secured in the recess away from the surfaces for contact with moving air, and that a seal is placed in the recess.

In addition to the aforementioned method, and to satisfy the context already mentioned, the invention also concerns an acoustic management system, comprising:

at least one support area:
  on an aircraft turbomachine comprising an air inlet cone, and/or
  on a nacelle of such a turbomachine comprising:
    at least one outer structure comprising at least one outer annular casing, and possibly:
    an inner structure comprising a fairing of a turbojet engine, which turbojet engine comprises a fan comprising said air inlet cone, the inner structure of the nacelle then defining, with the outer structure, an annular vein of secondary air, and
    an exhaust nozzle comprising an outer primary nozzle sleeve and an inner primary nozzle tip defining between them an outlet channel for a primary air flow exiting the turbojet engine, and
  a first panel,
characterised in that:
  on at least said support area of the turbomachine or of the nacelle is reserved at least one recess, recessed with respect to a surrounding general surface of said support defining a surface for contact with moving air:
    in the turbomachine, on the air inlet cone, or
    on the nacelle,
  the recess is adapted to receive said first panel, which has a surface for contact with moving air,
  the support and/or said first panel comprise removable connecting elements for, in the recess, mounting said first panel removably with respect to the support, and
  said first panel is an acoustic panel or a non-acoustic panel, and the assembly further comprises a second panel:
    which is an acoustic panel if the first panel is non-acoustic, and vice-versa, and
    which, together with the support, is adapted to be received in the recess, in place of the first panel.

With such an assembly, and as noted above, e.g. in a conventional configuration (panels of rounded, typically relatively cylindrical shape, with a marked thickness at the ends), removing an acoustic panel reveals a depth of recess (such as a difference in wall radii) between the location of the acoustic panel and the adjacent wall(s). This can induce a significant aerodynamic penalty, increasing with the difference in radii observed between two adjacent walls (which can be of the order of several tens of mm). Furthermore, it is noted that some noise-reduction technologies can help to minimise the size requirements (e.g. porous materials). Thus, it can be thought that the aerodynamic penalty associated with depth, which can be materialised by a vein cross-section deviation, can reach relatively low levels (acceptable with respect to a balanced compromise between performance and acoustics). The issue of size is particularly important with regard to the thickness of the panel. On a conventional panel, the thickness is conditioned by the tuning frequency (the one to be attenuated), and therefore by the wavelength of the acoustic signal. The lower the frequency, the higher the wavelength, and the thicker the panel should be.

Some solutions provide for so-called "folded"—or (re)folded—or "inclined" cavities which then extend in several directions (e.g. radial+axial) so as to minimise the thickness of the panel. With porous materials, it is rather the inner structure of the material that adjusts the tuning frequency, allowing low frequencies to be processed inside smaller spaces compared to conventional honeycomb panels.

However, even in small dimensions, discontinuities in the wall of the support (abrupt changes in an air flow line) can cause harmful aerodynamic disturbances. In order to address this problem, the following alternative or complementary solutions are proposed:
  with respect to the surrounding general surface of the support, the recess is defined by a simple recess with a single shoulder;
  the recess is linked with the surrounding general surface of said support by walls having inflection points;
  the recess is linked with the surrounding general surface of said support by walls having oblique surfaces;
  the recess adapted to receive said panel and the panel adapted to be received therein have, facing each other, respective contours which are substantially complementary;
  at least in the periphery of its surface for contact with moving air, the panel is flush with the surrounding general surface of said support; and/or
  said surface for contact with the moving air of the panel is solid and has a roughness of less than 5 µm; and/or
  the first or second panel is made of a composite material, comprising a carbon matrix and a resin, or is made of a metal sheet with which stiffeners are assembled, away from said surface for contact with moving air; and/or
  the surface of the first or second panel adapted for contact with the moving air is curved towards the centre with respect to its periphery and peripherally has a linking slope adapted for joining the surrounding general surface of said support (the first or second panel and said general surface therefore come flush), when the panel is received in the recess; and/or
  removable aerodynamic smoothing elements are provided with oblique surfaces and/or surfaces with inflection points arranged, or to be arranged, in the recess; and/or
  the recess has first side walls substantially perpendicular to the surrounding general surface of the support,
  received in the recess, the panel has second side walls substantially parallel to the first side walls, and
  without a panel in the recess, removable aerodynamic smoothing elements having oblique and/or inflection-point surfaces are arranged in said recess adjacent to the first side walls.

Another aspect dealt with concerns the consideration of problems related to the weight, size and structural stability of the panels. It is in this context proposed, as alternatives or complementary solutions:
  that the first or second panel has a thickness of less than or equal to 5 mm; and/or
  away from the surface for contact with moving air:
    the first or second panel consists of a plate reinforced with stiffeners,
    on a side opposite to that on which the surface for contact with the moving air is located, that the stiffeners extend into a volume contained within the overall dimensions of the removable connecting elements; and/or
  that the first or second panel comprise a plate, away from the surface for contact with moving air, reinforced by stiffeners, and
  transversely to its surface for contact with moving air, that the first or second panel, comprising the plate, stiffeners and removable connecting elements, has a total thickness of less than or equal to 80 mm; and/or
  that the first or second panel comprise a plate, away from the surface for contact with moving air, reinforced by stiffeners, and
  transversely to their surfaces for contact with moving air, that the recess and the first or second panel, which comprises the plate, the stiffeners and the removable connecting elements, have total thicknesses of less than or equal to 100 mm.

For ease of implementation and/or maintenance, the first or second panel may be formed by several sub-panels which together occupy the space of the recess, once placed inside.

The invention will be better understood and other details, characteristics and advantages of the invention will appear on reading the following description, which is given as a non-limiting example, with reference to the attached drawings.

DETAILED DESCRIPTION

Figure 1:
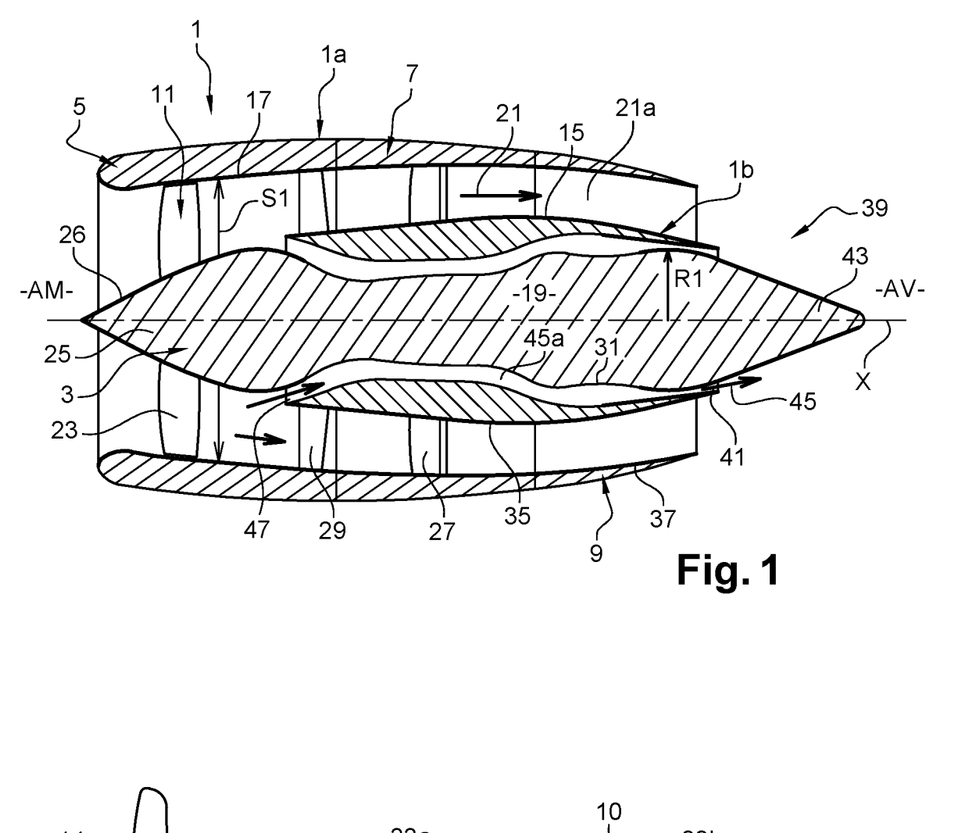
FIGS. 1 and 2 are two axial sections (X axis) of two applications of the solution of the invention.
Figure 2:
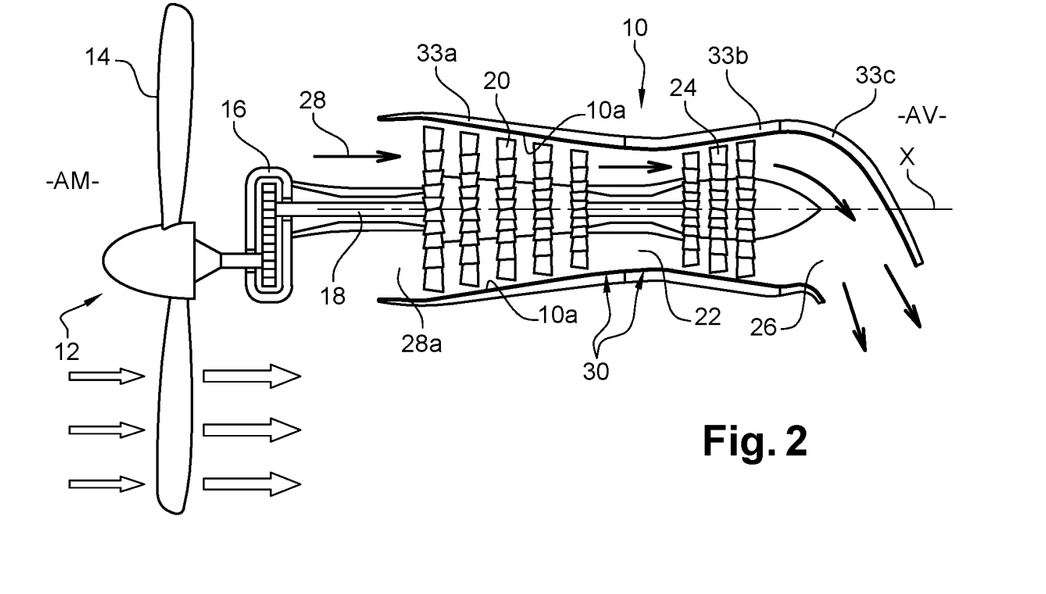

FIGS. 1 and 2 therefore shows two possible cases in which the invention can be applied.

FIG. 1 shows a nacelle 1 of a double-flow aircraft turbojet 3. The nacelle 1, which therefore constitutes a support and cowling assembly for the aircraft turbomachine concerned and which ensures its connection with the aircraft fuselage, conventionally comprises an outer structure 1a comprising an upstream section 5 (US) forming an air inlet, a middle section 7 and a downstream section 9 (DS) which can incorporate means of thrust reversal. The upstream section 5 or the middle section 7 has an inner wall formed by a casing 17 of a fan 11 of the turbojet. In this description the fan casing 17 can define the "outer annular casing" mentioned elsewhere. It has been considered here that the casing 17 (and therefore the other casings that define the outer annular wall of the secondary vein 21a) belong(s) to the nacelle; it/they could however be attached to the turbomachine; the same applies to the casing(s) of part 1b of the nacelle. The nacelle 1 also has an inner structure 1b comprising (at least) a fairing 15 of the turbojet engine 19. The outer structure 1a of the nacelle 1 defines, with the inner structure 1b, an annular air vein 21, often referred to as the "cold or secondary air vein", as opposed to the hot air generated by the engine 19, through which a so-called primary vein passes.

The fan 11 comprises an propeller having a plurality of blades 23, mounted about the axis of rotation X on a hub 25 rotatably mounted with respect to the fan casing 17. Downstream of the fan 11 there are outlet guide vanes 29 (OGV) to straighten the cold air flow generated by the fan 11. Structural arms 27 is radially connecting the nacelle 1 to the inner structure 1b. IGVs may be present in the form of a grid of vanes located in the primary flow 45a, upstream of the low-pressure compressor. The hub 25 is connected upstream to an air inlet cone 26 of the turbojet. The downstream section 9 comprises an inner fixed structure 31 (IFS) surrounding the upstream part of the turbofan 3, an outer fixed structure 35 (OFS) and a mobile cowling 37 that can include means of thrust reversal. A suspension mast (not shown) supports the turbojet 3 and the nacelle 1. The nacelle 1b ends downstream with a profiled exhaust nozzle 39. The outer and inner surfaces of the primary flow (respectively defined by the primary nozzle sleeve 41 and the primary nozzle plug 43) define between them the downstream terminal part, the outlet, the channel or the flow vein 45a of the primary air flow (hot) exiting the turbojet.

In FIG. 1, marked in bold type, are the contact surfaces for the moving air 21 or 45, which can typically be those of a panel 30 or 32, as provided for in the invention: acoustic or non-acoustic panel. This is the entire inner surface of the nacelle's outer structure 1a, the (outer) fairing 15, the air inlet cone 26 to the primary air inlet lip 47, the fixed outer structure 35 and/or the inner module 43, from upstream of the primary air outlet to the downstream end of the outer module 41.

FIG. 2 shows a nacelle 10 of another aircraft turbomachine, here an aircraft turbo-propeller 12. The nacelle 10 is also known as a fairing. It comprises a structure 30, outer (in the sense that it surrounds vein 28a), comprising at least one annular casing, here three 33a,33b,33c, themselves therefore outer, around the X axis. The turbo-propeller 12 comprises, from upstream to downstream, along the axis of rotation X, a propeller 14 (a towing propeller, thus placed at the upstream end in this example), a reduction gear 16 engaged with the propeller and which drives an axial shaft 18 along which a compressor 20 is staggered, a combustion chamber 22 and a turbine 24, downstream of which the gases leave via an exhaust outlet 26. The energy recovered by the turbine(s) 24 drives the compressor(s) and, through the reduction gear(s) 16, the propeller. The nacelle 10 extends around the X-axis from the upstream end of the compressor 20 to the downstream end of the exhaust outlet 26.

In FIG. 2, the surfaces for contact with the moving air 28 which, via vein 28a, enter the compressor 20, therefore the nacelle 10, and which can typically be those of a panel 30 or 32, as provided for in the invention, have also been marked in bold type: this is the entire inner surface 10a of the nacelle.

These two examples indicate that there are therefore certain critical areas on an aircraft turbomachine where the noise reduction of a surface exposed to the moving air (21,28,45) is specifically considered.

It is understood that the present invention is intended to seek to refine the ability to adapt the level of noise-reduction technology of such a surface depending on the needs of the users: depending on these needs, reducing noise is useful or not, necessary or not, required or not. It is important to be able to adapt to circumstances.

Figure 3:
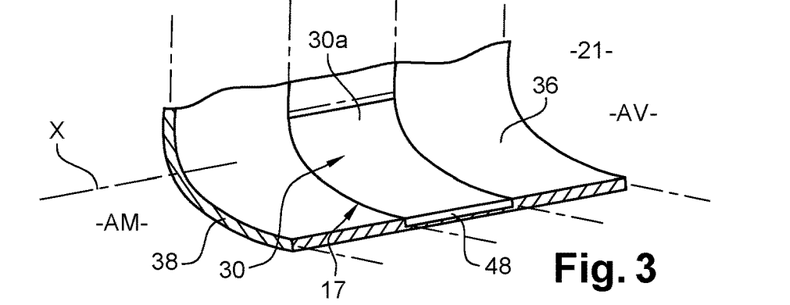
FIG. 3 shows a support area of a nacelle or of a aircraft turbomachine where acoustic management as proposed by the invention can apply.

FIG. 3 and following seek to illustrate the solutions proposed here to provide such an adaptation.

First of all, if noise limitation is sought, it is through the presence (in itself known) of a panel 30 with acoustic characteristics that this should/will be translated.

It is specified that a panel 30 (with acoustic characteristics) is a panel with the following characteristics:
- the sound attenuation level associated with the panel is greater than 1 dB on at least one frequency between 100 and 10000 Hz,
- and/or the absorption coefficient which characterises the panel is greater than 0.1 on at least one frequency between 100 and 10000 Hz,
- and/or the rate of open area at the wall in contact with the flow (POA: Percent Open Area), excluding openings dedicated to the hanging system, is greater than 2.5% of the panel surface.

However, a substitute panel 32 with non-acoustic (characteristics) and/or, positively defined, with aerodynamic characteristics could be preferred.

It is specified that a panel 32 with non-acoustic (characteristics) or with aerodynamic characteristics is a panel with the following characteristics:
- the sound attenuation level associated with the panel is less than 1 dB on frequencies between 100 and 10000 Hz,
- and/or the absorption coefficient that characterizes the panel is less than 0.1 on frequencies between 100 and 10000 Hz,
- and/or the rate of open area at the wall in contact with the flow (POA: Percent Open Area), excluding openings dedicated to the hanging system, is less than 2.5% of the panel surface, or even:
- where the permeability of the various materials used to form the substitute panel 30 is less than 90%,
- and/or with a diameter of the possible pores (perforations) visible on the surface of the panel of less than 0.4 mm,
- and/or the volume of any cavity (volumes of air considered to be closed if the openings communicating with the flow within the vein under consideration are not taken into account) has a volume greater than 30 cm3,
- and/or which has no cavities (exclusively inner or opening on the surface),
- and/or which does not have a sandwich structure (superposition of layers of different materials by gluing).

From an aerodynamic performance point of view, a panel 32 can be characterised by a roughness lower than that of the acoustic panel 30 (a criterion easily achievable by eliminating microperforations, for example), which is favourable for minimising the frictional losses of the fluid flow on the surface of the panel.

From a weight point of view, a substitute panel 32 is freed from acoustic constraints, giving an additional degree of freedom to optimize the design, reduce the amount of material and select lighter materials. The following points are advantageous in terms of weight:
- absence of a honeycomb structure having the functionality of forming a multitude of resonators, and/or
- absence of any porous material of foam type (polymer, metal, ceramic, vegetable . . . ), or wool (rock wool, glass wool . . . ) with good sound-absorbing properties.

One aspect of the invention is therefore to be able to substitute a panel 32 with non-acoustic characteristics for a panel 30 with acoustic characteristics, and vice-versa.

Structurally different, the two panels 30,32 may be identical in terms of sizes (lengths, widths, thicknesses . . . ) as long as they are both adapted to be placed in a recess 34 formed in a recess 36 with respect to a surrounding general surface 36 of a support 38 belonging to the turbomachine 3,12 or its nacelle 1,10.

It is specified that a panel 30 or 32 support 38 is a structure of the turbomachine 3,12 or its nacelle having a surface for contact with the moving air (21,28 or 45), as is (when this air is actually moving, therefore when typically the aircraft is flying):
- the outer surface, respectively 30a or 32a, of panel 30 or 32, when the panel is located in the recess 34,
- and the outer surface 34a of the notch 34, when no panel 30 or 32 is located in the notch.

Thus, the support 38 can be a frame element and/or comprising beams and itself panels, in particular to define the outer surfaces 30a,32a,34a. The outer surfaces 30a,32a,34a can have so-called aerodynamic characteristics, as can preferably be the surrounding general surface 36.

The general surrounding area 36 is the area adjacent to the recess 34. It limits or delimits it. Since the outer surfaces 30a,32a,34a must be for contact with the moving air (21,28 or 45) and are located in a gas vein (air or air/fuel mixture), they will be limiting surfaces of such a vein. In aircraft, these surfaces are well known. We know how to identify them and implement them. The outer surfaces 30a,32a,34a will typically be concave (radially outer vein boundaries), or convex (radially inner vein boundaries). Given that noise diffusion is to be managed a priori in all directions, placed in a so-called vein, the surrounding general surface 36 could typically be closed (present a perimeter), extend around the X axis, be annular around it, or parallel to it.

Figures 9, 10, 11, 12, 13:
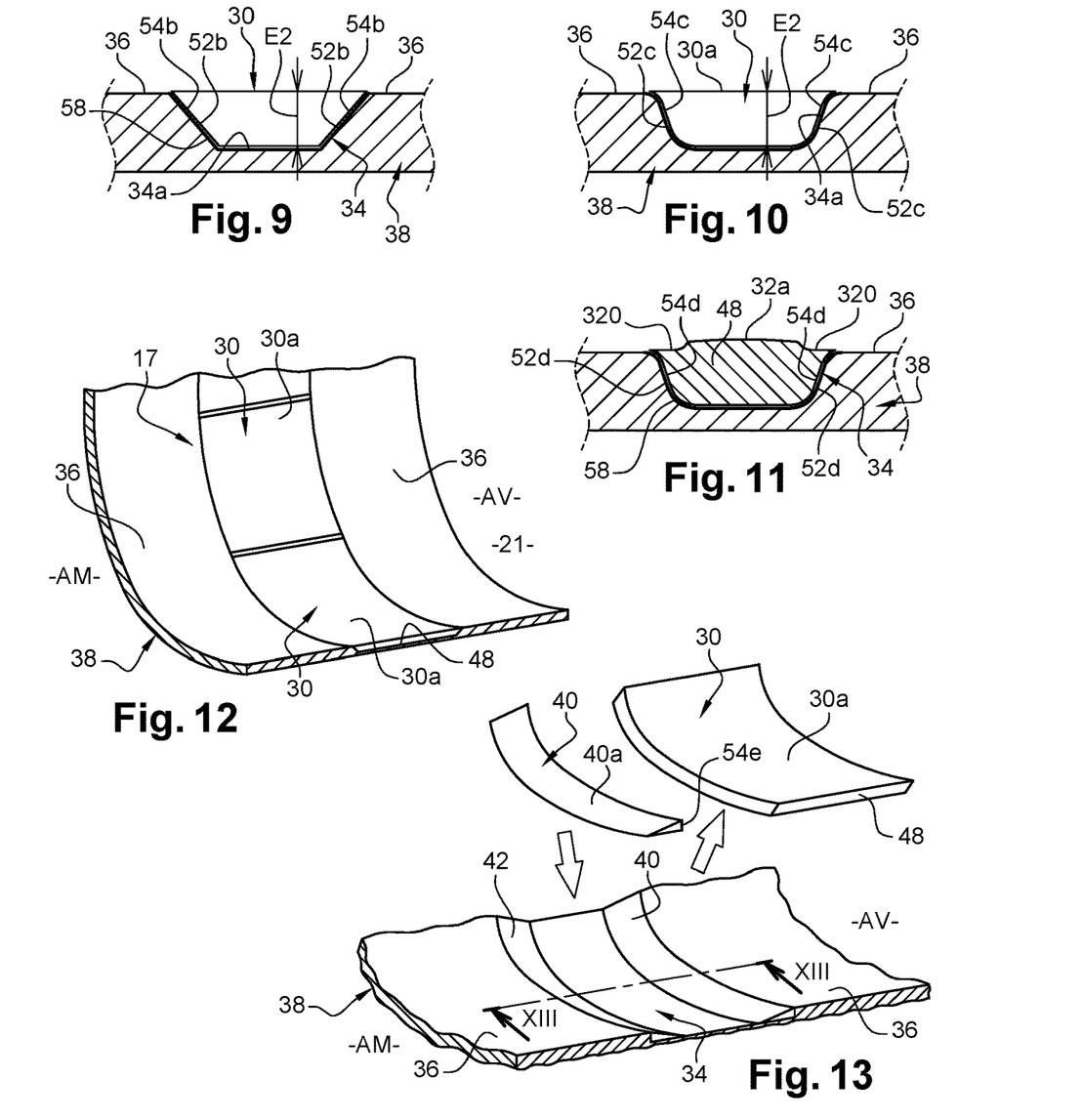
FIGS. 9, 10, 11 shows three alternatives to the V-V axial section, with different forms of recess 34, as well as for the panel placed in the recess.
FIG. 12 shows an embodiment as an alternative to FIG. 3.
FIG. 13 shows an embodiment as an alternative to FIG. 4.
Figure 14:
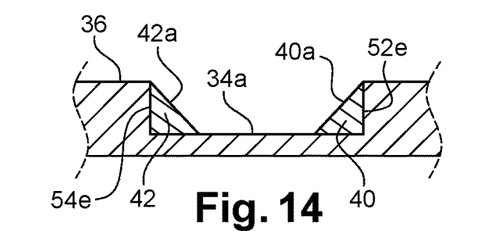
FIGS. 14, 15 show alternatives to the XIII-XIII axial section of FIG. 13.
Figure 15:
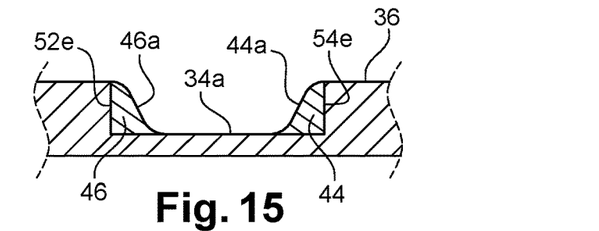

Since the panels 30,32 are a priori interchangeable and may or may not be present in the recess 34 designed to receive them alternatively, in a removable manner, the respective dimensions of the recess 34 (length L1, width I1, depth E1, FIG. 5) and those corresponding to the panels 30,32 (length L2, width I2, thickness E2, FIG. 4) will preferably be identical, to the installation/removal clearances, and except in the case of the use of removable aerodynamic smoothing elements, or seals, 40-46; see FIGS. 13-15.

Figure 7:
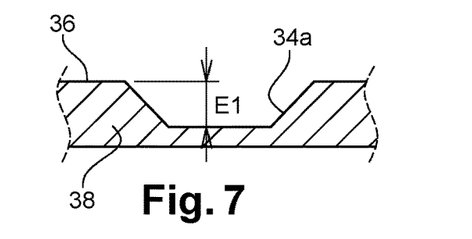
FIGS. 7, 8 shows alternatives to the VI-VI axial section of FIG. 6.

Before going back to such seals 40-46, it is important to specify that the following procedure is therefore to be followed at the location of each recess 34, depending on an acoustic or aerodynamic criterion; Five possible cases:
a) the recess 34 having no said panel 30,32 placed therein, we leave the recess 34 as it is, without any panel, as shown, for example, in FIGS. 6-8, or
b) the recess 34 having no said panel 30,32 placed therein, a said panel 30,32 is placed therein, or
c) the recess 34 having a said panel 30 or 32, it is removed and replaced by a replacement panel 32 or 30, said replacement panel being an acoustic panel if the removed panel is non-acoustic, and vice-versa, as shown, for example, in FIGS. 3,4, or
d) one said panel 30,32 being located in the recess 34, the panel is removed and the recess 34 is left without any said panel placed therein, as shown, for example, in FIG. 13, or
e) the recess is left 34 with a said panel placed inside, as shown, for example, in FIG. 3.

This is the case c) that is favoured here.

Figures 4, 5, 6:
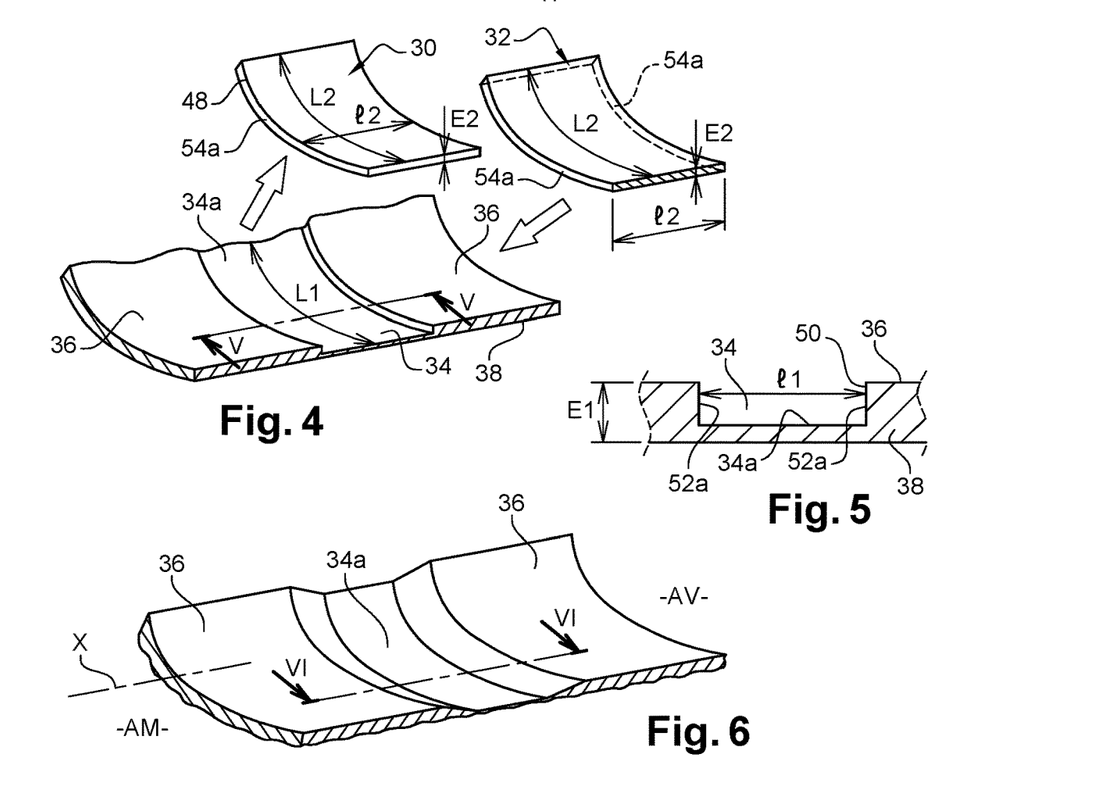
FIG. 4 shows the same area, panel removed, changed by another one ready to be put back in place of the first one, for said acoustic management.
FIG. 5 is the V-V axial section of FIG. 3.
FIG. 6 shows an embodiment as an alternative to FIG. 4.

In a first embodiment more particularly illustrated in FIGS. 3-5, it is moreover proposed to design:

a 34 recess to minimize aerodynamic penalties in the absence of a panel 30 or 32, as well as an acoustic panel 30 whose shape, including the dimensions, adapts to the recess 34.

In this respect, it is understandable that, for example, in a vein such as that of 21*a* (air 21) and on the outer casing 17, in a classic configuration (panels of relatively cylindrical shape with a marked thickness at the ends—i.e. not thinning out at the ends to end up gradually decreasing in thickness—), the removal of the acoustic panels 30 (as in FIG. 5 where the mixed lines mark a possible annular continuity) reveals a difference in vein depth E1 (difference in wall radius) between the location of the acoustic panel and the surrounding general surface 36. This gives rise to a significant aerodynamic penalty, increasing with the difference in radii (thickness of E1) observed between two adjacent walls (of the order of several tens of mm). However, certain noise-reduction technologies can help to minimise the space required (porous materials 48, for example, such as sound absorbers: honeycomb, porous material, or other). Thus, the aerodynamic penalty associated with this deviation E1 of vein sections (see section S1 FIG. 1, perpendicular to the X axis, at the fan casing) can be reduced/limited to a relatively low level, acceptable for a balanced compromise between performance and acoustics.

This being the case, even in small dimensions (thicknesses/depths in particular), discontinuities in the surface 36 of the support (abrupt change of section S1 in the example) can generate relatively significant aerodynamic disturbances. In order to remedy this problem, it is proposed to shape the support 38 with a specific shape upstream (US) and downstream (DS) of the area 34, and preferably of the area dedicated to the removable attachment of optional panel 30 or 32.

Thus one may wish to avoid the shape of FIGS. 4,5.

However, this shaping has some advantages:

with respect to the surrounding surface 36, the recess 34, clearly visible in FIG. 5, is defined by a single recess, with a single shoulder 50, the recess 34 has first side walls 52*a* which are substantially perpendicular to the surrounding surface 36 of the support, received in the recess 34, the panel has second side walls 54*a* substantially parallel to the first side walls, and as in the various situations shown, the recess 34 and the panel 30 or 32 adapted to be received there have, with respect to each other, substantially complementary contours, as can be seen in FIGS. 3 and 9-12.

Regarding this last aspect, one notes that, with reference to the sections of FIGS. 3 and 9-11 that the side walls (of thickness) of the recesses 34 and of the panels 30,32 respectively have indeed substantially complementary contours: 52*b*/54*b*; 52*c*/54*c*, 52*d*/54*d*.

Overall, in contrast to the abrupt shape 50 in FIG. 5, the shapes of the other solutions above allow for a gradual transition via possible changes in the radii of the side walls concerned, such as 52*c*/54*c*, 52*d*/54*d*, particularly at the axial edges/axial side walls of the surface dedicated to the removable attachment of the panel 30 or 32 considered. It is these axial edges (upstream and downstream) that are shown in the sections of the various FIGS. 9 to 11 in particular). The other edges/side walls may have the same shapes as the so-called "axial" sides, i.e. sides perpendicular to the X-axis.

Figure 8:
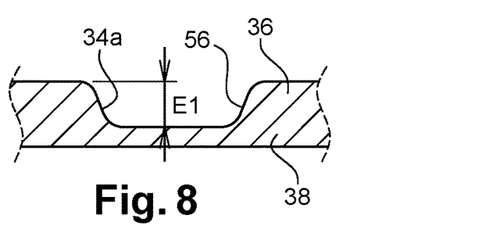

The surfaces 52*b*/54*b*; 52*c*/54*c*, 52*d*/54*d* are relatively tangential with respect to surfaces 34*a*,36 to be linked so as to minimize angles, and thus minimize aerodynamic disturbances. Thus, the drawing of this surface may have an inflection point, as in the solution, examples of which are shown in FIGS. 8, 10, 11; see marker 56 FIG. 8 as an example. The axial extent of each of these radius variations will advantageously be less than a quarter of the axial extent (dimension 12 in the example) of the optional panel 30,32, so as to minimize the loss on the volume dedicated to the panel (compared to the abrupt shape 50 in FIG. 5).

If such an abrupt form is to be avoided, it is then proposed to consider the following, with reference to FIGS. 6-11.

At least at its axial ends, that is to say, upstream and downstream, the panel 30,32 has a shape that is oblique and/or has inflection point(s), as is the shape of the outer surface 34*a* of the recess 34 with respect to the surrounding general surface 36. And we see FIGS. 9-11 that these oblique and/or inflection point(s) shapes will advantageously be substantially complementary to each other; same dimensioning, even the same inflection point.

At least at its axial ends, that is to say, upstream and downstream, the radius corresponding to the alveolar surface of the panel is substantially equal to that of the adjacent side walls of the recess 34, as shown in FIGS. 10-11. This radius (such as R1 in FIG. 1) is defined by the distance between the X axis of the turbomachine and the surface of the panel in contact with the fluid flow of the vein, the alveoli in said surface being those existing in the case of a honeycomb-type acoustic panel—. In this case, seals could be placed between these side walls and the panel 30,32 to bridge the gaps and provide aerodynamic surface continuity at least at the axial ends of the panel.

At other points, the radius associated with the surface walls of the panel may vary and be slightly smaller than the radii observed at the axial ends, so as to slightly increase the thickness of the panel. It is then understood that by decreasing the above-mentioned radius (such as R1 FIG. 1), without modifying the position of the bottom of the 30,32 panel location, the thickness of this panel is increased.

The advantage of these types of configuration is to minimize the E1 depth in the absence of a panel, thus minimizing the associated aerodynamic penalties, while maximizing the thickness of the optional panel 30,32.

In a certain embodiment, the perforated surface of the panel may have a smaller radius than the adjacent side walls of the recess 34; see FIG. 11 and radius R1 FIG. 1, as an example for one of these surfaces which may be honeycombed. This configuration makes it possible to optimize the performance of the design of the considered vein, in the absence of a panel 30,32, for an optimised efficiency of the panel, to the detriment however of other aspects related to performance and operability, when a panel is present.

If, despite the above-mentioned optimisation options, a problem of insufficient panel thickness E2 30,32 remains, it is illustrated as an example in FIG. 11 that, received in notch 34, the panel may present an outer surface 30*a* or 32*a* (FIG. 11) suitable for contact with moving air, which is curved towards the centre with respect to its periphery and which peripherally presents a linking slope 320 for joining the surrounding general surface 36 of the support, thus coming flush with it. At least in the periphery of its surface 30*a*,32*a* for contact with moving air, the panel is flush with the surrounding general surface 36 of the support. In connection with FIGS. 12-15, we shall now discuss a case where we wish to avoid a disadvantage of the above solutions, as shown in FIGS. 6-11, namely a loss of panel volume at the ends due to the gradual reduction of its thickness E2. The embodiment presented below proposes a solution including the installation of the removable aerodynamic smoothing elements 40-46 already mentioned, in order to maximise the volume of the recess 34 available for said optional panels 30,32. In this configuration, it is proposed:

that the recesses 34 have first side walls 52e substantially perpendicular to the surrounding general surface 36 of the support (see FIGS. 14-15), this (at least) at the upstream and downstream ends, and, without a panel in the recesses 34, to arrange such removable elements 40-46 therein so that they are individually adjacent to said first 52nd walls of the corresponding recess.

The elements 40-46 have:

said second side walls 54e substantially parallel to the first side walls 52e, and directed towards the inside of the recess, lateral surfaces (thus in contact with the gas flow) which are oblique, flat, such as those 40a,42a in FIG. 14, or with one or more points of inflection, such as surfaces 44a,46a in FIG. 15.

The removable elements 40-46 thus form seal-type elements that will smooth out the aerodynamic disturbances due to the recesses 34. They may have the following characteristics:

the seal 40-46 is in the form of a ring segment (see FIG. 13, element 40 only) or a ring (see FIG. 13, element 40,42 in place in the recess, not limited) when, radially to the X axis, a vein is limited by a concave (outer limitation) or convex (inner limitation) annular surface. In the case of a ring segment, the seals can be butt-jointed circumferentially until a complete ring is formed. This is transposable to the panel(s) 30 or 32: ring or sectors of a ring end to end, around the X-axis.

the radial overall size (on the X axis) associated with the section of the/each element 40,42 is approximately equal to the difference in radius between the surface dedicated to the integration of the optional panel and the bottom of the recess 34, the axial size associated with the section of each element 40,42 is less than 50% of the axial extension of the surface of the recess 34 dedicated to the integration of the panel, the surface of each element 40,42, in contact with the fluid flow (21,28 or 45), allows a progressive transition from the radius of the upstream surface 36 to the radius of this same surface, downstream. Preferably, this surface is relatively tangential to the sidewall surfaces to be linked, so as to minimize aerodynamic disturbances. Thus, the drawing of this surface may present an inflection point, as already presented (see FIGS. 8,10, 11 and their explanations), at its upstream and downstream ends, the/each element 40,42 may be glued to the walls 54e to be linked, in order to avoid any damage (tearing) caused by aerodynamic forces inside the vein, the/each element 40,42 can cover the attachment elements of the optional panels 30,32, so that no additional mounting operation is required to conceal these elements, the attachment elements for said optional panels may be used as attachment elements for the/each element 40,42.

For the removable attachment of the panels 30,32, as attachment element(s), also known as removable connecting elements, a glue or unscrewable screw fastener(s) or threaded bores in the support (especially in the recess 34) can be provided, for example, so as to avoid an additional assembly operation for concealing these elements. FIGS. 9,11, these removable connecting elements, here defined for example by an adhesive, have been marked 58.

All of the above can of course be used to improve the acoustic performance of a turbomachine already in service.

Thus, for example, during the assembly of an engine 3,12 and/or its nacelle, aerodynamic smoothing elements 40,42 could be positioned at the upstream and downstream ends of the surface 34 dedicated to the optional panel, on a fan casing or a nacelle, for example.

For routine maintenance, these components 40,42 may be dismantled and repaired, or dismantled and replaced by new parts At the request of a user, for example, elements 40,42 can be removed and replaced by panels 30, or more probably 32, in order to reduce the noise level of the turbomachine.

Conversely, at any time during maintenance, particularly if a panel 30 or 32 is damaged, for example, a user could request its replacement by a replacement panel 30 or 32 to reduce the cost associated with the maintenance of the user's engine.

In the foregoing it was assumed that a single said panel 30,32 could be placed in a recess 34. In fact the expression "one panel" (30,32) includes the fact that the (at least) one (first or second) panel may be formed of several sub-panels which together occupy the space of the recess 34, once placed inside.

Figures 16, 17, 18:
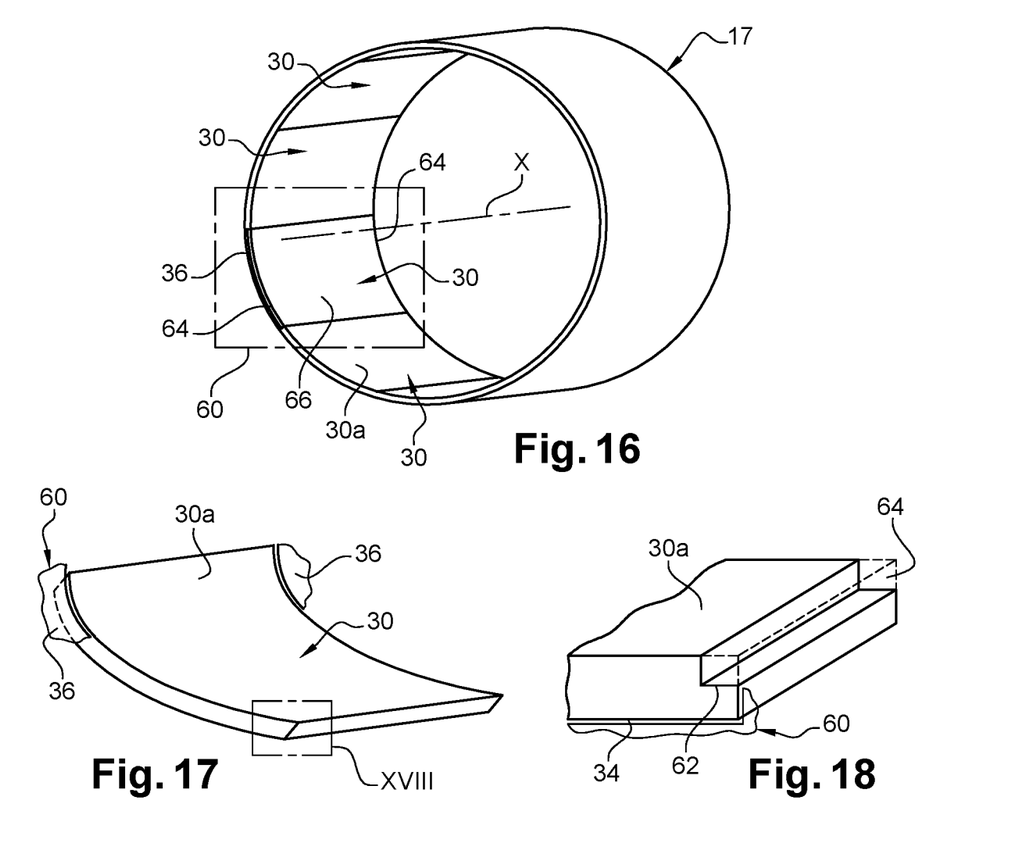
FIG. 16 shows a fan casing lock equipped with panels according to the invention.
FIG. 17 shows one of the panels of FIG. 16.
FIG. 18 shows details of XVIII of FIG. 17.
Figure 19:
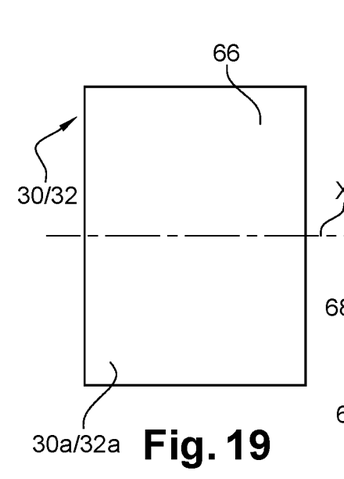
FIGS. 19, 20, 21 shows the front and then back (FIGS. 20, 21) of a panel structure according to the invention.

An example of an area 60 of a support, or support structure, of a turbomachine or of an aircraft nacelle, here a fan carter 17 is best visualised in FIG. 16. This may be the same area as FIGS. 3, 4, 6, 12, 13, or any area containing at least one of the surfaces 10a, 15, 26, 35, 43 marked in bold type FIG. 1 or 2. We find the panels 30 and/or 32, here those 30 which, sectorised, form together, circumferentially, the concave inner surface of the casing 17.

As shown in FIGS. 17, 18, each panel 30 shall be favourably designed with a surface 30a for contact with the moving air that is solid (non-porous) and has a roughness of less than 5 µm, preferably 0.5 µm, for aerodynamic optimisation and to avoid the disadvantages of an acoustically absorbent surface/structure. A linking edge of the panel by which the panel is linked with the surrounding general surface 36 of the support 60 is shaped with a notch 62.

Thus, in cases b) or c) or b) to d) above, the panel concerned will be removably placed in notch 34, away from the surfaces 30a,36 for contact with moving air, and a seal 64 will be placed in the notch.

Preferably several edges on the periphery of the panel will be formed in this way; see FIG. 16.

Figures 22, 23:
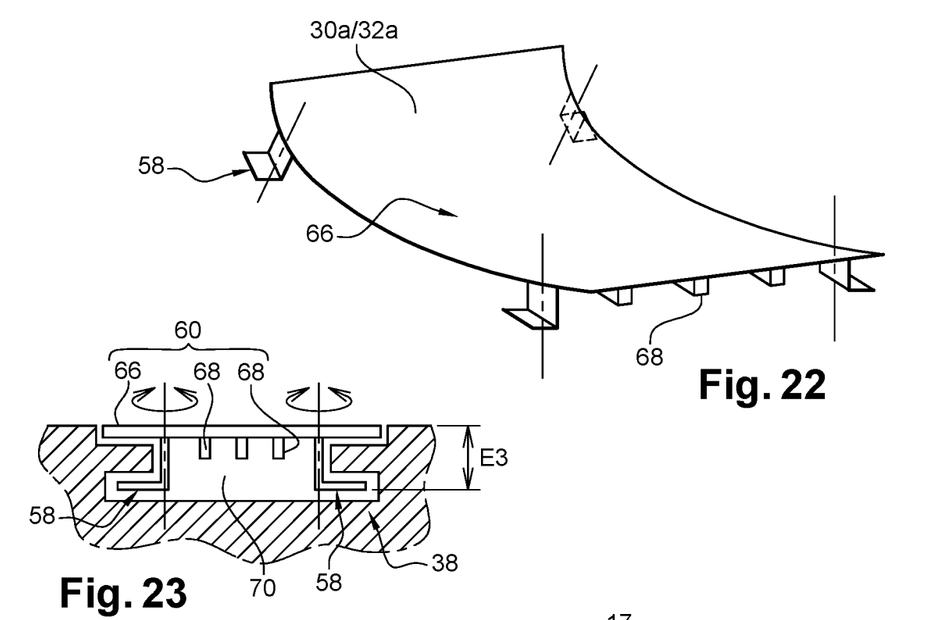
FIG. 22 shows another panel according to the invention.
FIG. 23 shows a section according to XXIII-XXIII of FIG. 24.
Figure 24:
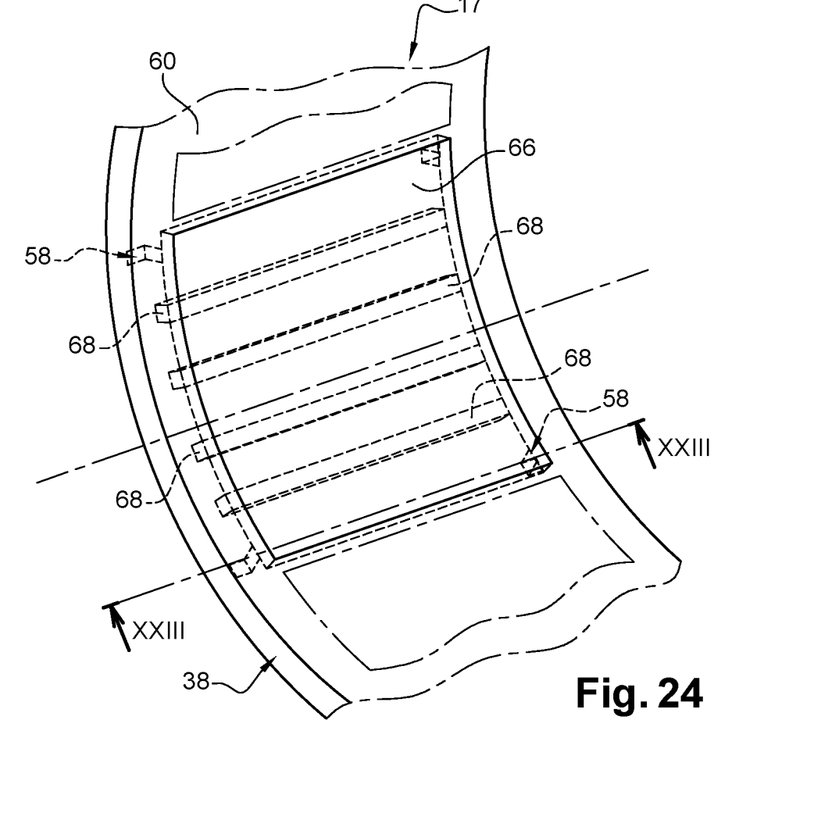
FIG. 24 shows more details of a part of the fan casing of FIG. 16 equipped with panels according to the invention.

At least if the areas concerned are as follows: surfaces (10a,15, 26,35,43), each panel will comprise, as shown in FIGS. 22-24, a plate 66, with surface 30a or 32a, reinforced, away from this surface for contact with moving air, by stiffeners 68, and, transversely to its surface 30a or 32a, the panel will comprise the plate, the stiffeners and the removable connecting elements 58.

The plate 66 (at least its surface 30a or 32a) will then have a curved shape, which may be a cylinder or sector of a cylinder, concave (as in FIG. 16) or convex. In the case of a sectorised element, the juxtaposition of several of these panels on a circumference will make it possible to reconstitute the wall over 360° (as shown in FIG. 16). The advantage of either configuration mainly concerns the mounting.

The radius (fixed or variable, circumferentially) characterizing the curvature of the surface 30a or 32a will be favourably equal to that of the adjacent surface 36, to promote flow in the vein.

Preferably, the thickness of the plate 66 will be less than 5 mm, preferably 3 mm, in order to minimise the weight and the size of the panel.

In order to promote compactness, weight and size compatible with an operational and commercial use of said panels, preferably:

the stiffeners 68 will extend, on a side opposite to that on which the surface for contact with the moving air is located, into a volume 70 contained within the overall dimensions of the removable connecting elements 58, as shown in FIGS. 22,23, and/or transversely to its surface for contact with moving air, the panel, comprising the plate 66, the stiffeners 68 and the removable connecting elements 58, will have a total thickness E3 less than or equal to 100 mm, and preferably between 10 and 60 mm.

Figure 20:
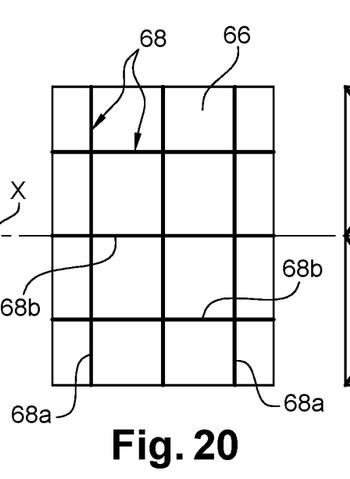
Figure 21:
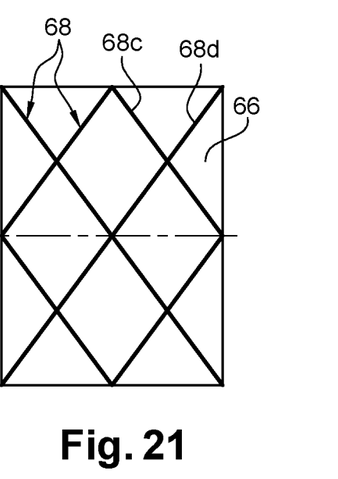

The stiffeners 68 may comprise rings 68*a* oriented along the X axis (vein axis) and axially distributed (FIG. 20). These rings can be supplemented with axial reinforcement elements 68*b* so that, orthogonally to the rings, meshes can be formed. Their height will be favourably lower than the height of the attachment elements 58. Other stiffener placements, such as diamond-shaped, with 68*c*, 68*d* cross-reinforcement elements, are possible (see FIG. 21)

As removable fastening/bonding elements used for attaching the panel to its support (casing, other part of the turbomachine or nacelle, etc.), one could provide material extrusions with suitable holes for bolted connecting elements (removable) or material extrusions with contact surfaces for gluing the part directly to its support, or spacers aligned with threads in the panel support to ensure screw clamping and a stop on the support. The panel can also be equipped with other extrusions of material serving as a stop to facilitate the proper positioning of the panel in its place on the support.

As such, each panel 30,32 will preferably be made of composite material, comprising a carbon matrix and a resin, or will be made of metal sheet with which stiffeners 68 will be assembled, away from the surfaces 30*a*,32*a* for contact with moving air. Advantages: controlled manufacturing and cost, reduced weight, repairs possible.

In addition to the advantages of the possible panels 30 and/or 32, at least one alternative can already be noted, which is offered in the usual case of solutions where the wall of the aerodynamic vein corresponds directly to the wall of the support 60. At the request of a user, a replacement panel 32 can also be removed and replaced by an acoustic panel 30, in order to reduce the noise level of the engine. Conversely, at any time during product maintenance (especially if the acoustic panel is damaged), a user may request replacement with a replacement panel 32, for example to reduce the cost associated with engine maintenance.

Irrespective of the foregoing and of the attached claims, and in particular of the invention to which each independent claim relates, an inventive step is considered to be present in the following (cases (i) and/or (ii) below):

(i): a method for the preparation of a support area and for acoustic management:

on an aircraft turbomachine (3, 12) comprising an air inlet cone (26), and/or on a nacelle (1,10) of such a turbomachine (3,12) comprising:

at least one outer structure (1*a*) comprising at least one outer annular casing (17), and possibly:

an inner structure (1*b*) comprising a fairing (15) of a turbojet engine (3,12,19), which turbojet engine (3,12,19) with an air inlet cone (26) comprises a fan (11), the inner structure of the nacelle (1*b*) then defining, with the outer structure (1*a*), an annular vein of secondary air (21), and an exhaust nozzle (39) comprising an outer primary nozzle sleeve (41) and an inner primary nozzle tip (43) defining between them an outlet channel for a primary air flow (45) exiting the engine (3,12,19) of the turbojet (3), in which method:

on at least said support area of the turbomachine (3,12) or of the nacelle (1,10) is reserved at least one recess (34), recessed with respect to a surrounding general surface of said support (112) defining a surface for contact with the moving air (21,28,45):

in the turbomachine (3,12), on the air inlet cone (26), or on the nacelle (1.10), the recess (34) being adapted to removably receive at least an acoustic panel (30) or non-acoustic panel (32), having a surface for contact with moving air, and, depending on an acoustic or an aerodynamic criterion:

(a) the recess (34) is left without any panel (30,32) placed therein, or b) the recess (34) being without any said panel (30,32) placed therein, a said panel (30,32) is placed therein, or c) with a said panel (30,32) placed in the recess (34), the panel is removed and the recess (34) is left without any said panel placed therein, and:

either, in case a) or c), removable aerodynamic smoothing elements (40,42) having oblique (40*a*,42*a*) and/or inflection-point surfaces (44*a*,46*a*) are placed in the recess (34), or the side walls of the recess (34) and of the panel are shaped, with at least one inflection point, or in case b):

the recess (34) being without any said panel (30, 32) placed therein, removable aerodynamic smoothing elements having oblique and/or inflection point surfaces are placed therein, and, subsequently, before placing a said panel (30,32) therein, the removable aerodynamic smoothing elements are removed and then a said panel (30,32) is placed therein;

ii) An acoustic management assembly, comprising:

at least one support area:

on an aircraft turbomachine (3,12) comprising an air inlet cone (26), and/or on a nacelle (1,10) of such a turbomachine (3,12) comprising:

at least one outer structure (1*a*,30*a*) comprising at least one outer annular casing (17,30*a* . . . ), and possibly:

an inner structure (1*b*) comprising a fairing (15) of a turbojet (3) engine (3,12,19), which engine (3,12, 19) comprises a fan (11,17) comprising said air inlet cone (26), the inner structure (1*b*) of the nacelle (1,10) then defining, with the outer structure (1*a*), an annular air vein (21*a*) of secondary air, and an exhaust nozzle (39) comprising an outer primary nozzle sleeve (41) and an inner primary nozzle tip (43) defining between them an outlet channel for a primary air flow (45) exciting the turbojet (3) engine, and at least one panel (30,32), characterised in that:

on at least said support area of the turbomachine (3,12) or of the nacelle (1,10) is reserved at least one recess (34), recessed with respect to a surrounding general surface (36) of said support (38) defining a surface for contact with the moving air (21,28,45):

in the turbomachine (3,12), on the air inlet cone (26), or on the nacelle (1,10), the recess (34) is adapted to receive said at least one panel (30,32), which has a surface (30a,32a) for contact with the moving air (21,28,45), the support (38) and/or said at least one panel (20,30,32) comprise removable connecting elements (58) for, in the recess (34), mounting said at least one panel removably with respect to the support, said at least an panel is an acoustic panel (30) or a non-acoustic panel (32), and:

either the recess (34) is joining the surrounding general surface of said support by walls having inflection points:

or:

the recess (34) has first side walls substantially perpendicular to the surrounding general surface of the support, received in the recess (34), the panel (30,32) has second side walls substantially parallel to the first side walls, and without a panel (30,32) in the recess (34), removable aerodynamic smoothing elements having oblique and/or inflection-point surfaces are placed in said recess (34) adjacent to the first side walls, or the assembly further comprises removable aerodynamic smoothing elements having oblique and/or inflection-point surfaces placed, or to be placed, in the recess (34), or the surface of the panel (30,32) adapted for contact with the moving air (21,28,45) is curved towards the centre with respect to its periphery and has a peripheral slope for being joined with the surrounding general surface of said support, when the panel is received in the recess (34).

In addition, points (i) and (ii) above may be supplemented by the following features, taken together or separately:

iii) a said assembly, in which the recess (34) is linked to the surrounding general surface of said support by oblique surface walls.

iv) a said assembly, in which the recess (34) adapted to receive said panel (30,32) and the panel adapted to be received therein have, facing each other, substantially complementary respective contours.

The invention claimed is:

1. A method for the preparation of a support area and for acoustic management:

the support area being located on an aircraft turbomachine (3,12) comprising an air inlet cone (26), or the support area being located on a nacelle (1,10) of such a turbomachine (3,12), the turbomachine comprising:

an outer structure (1a) comprising at least one outer annular casing (17), and an exhaust nozzle (39) comprising an outer primary nozzle sleeve (41) and an inner primary nozzle tip (43) defining between them an outlet channel for a primary air flow (45) exiting the turbojet engine (3,12,19), in which method:

on said support area of the aircraft turbomachine (3,12) or of the nacelle (1,10) is reserved a recess (34) hollow with respect to a surrounding general surface (36) of said support area, the outer surface (34a) of the recess (34) and the general surface (36) defining a surface for contact with moving air (21,28,45):

located in the aircraft turbomachine (3,12), on the air inlet cone (26), or located on the nacelle (1,10), the recess (34) being adapted to removably receive an acoustic panel (30) and a non-acoustic panel (32), each having a surface for contact with moving air (21,28,45), one in replacement of the other, and when the panel is received in the recess, at least in the periphery of its surface for contact with moving air, the panel is flush with the surrounding general surface of said support with respect to both sides of the panel in the direction of moving air, said method comprising the step of—depending on an acoustic or an aerodynamic criterion, removing one of said acoustic panel and non-acoustic panel from the recess (34) in which said one of the acoustic panel and non-acoustic panel was contained and:

a) placing in said recess a replacement panel (30,32) adapted to replace said one of the acoustic panel and non-acoustic panel and which has a surface for contact with moving air (21,28,45), said replacement panel being an acoustic panel (30) if the panel (32) removed is non-acoustic, and vice versa; or b) leaving the recess without a panel placed inside.

2. A method according to claim 1, in which:

the replacement panel (30,32) is manufactured with a surface for contact with the moving air which is solid and has a roughness of less than 5 μm, a linking edge of the replacement panel (30,32) by which the panel (20,30,32) is joined with to the surrounding general surface (36) of said support is shaped with a notch (62), and, the replacement panel (30,32) is removably secured in the notch (34) away from the surfaces for contact with the moving air (21,28,45), and a seal (64) is placed in the notch.

3. An acoustic management assembly, the acoustic management assembly comprising an area (60) of a support (38):

the support area being located on an aircraft turbomachine (3,12) comprising an air inlet cone (26), or the support area being located on a nacelle (1,10) of a turbomachine (3, 12), the turbomachine comprising:

an outer structure (1a,33a) comprising at least one outer annular casing (17,33a . . . ), and an exhaust nozzle (39) comprising an outer primary nozzle sleeve (41) and an inner primary nozzle tip (43) defining between them an outlet channel for a primary air flow (45) exiting the turbojet engine, and the acoustic management assembly further comprising a first panel (30,32), wherein:

on said area of the aircraft turbomachine (3,12) or of the nacelle (1,10) is reserved a recess (34) hollow with respect to a surrounding general surface (36) of said area, the outer surface (34a) of the recess (34) and the general surface (36) defining a surface for contact with moving air (21,28,45):

in the aircraft turbomachine (3,12), on the air inlet cone (26), or on the nacelle (1,10), the recess (34) is adapted to be used without a first panel and to receive said first panel (30,32), which has a surface for contact with moving air (21,28,45), and when the first panel is received in the recess, at least in the periphery of its surface for contact with moving air, the first panel is flush with the surrounding general surface of said support with respect to both sides of the panel in the direction of moving air, the support (38) and/or said first panel (30,32) comprise removable connecting elements (58) for, in the recess (34), removably mounting said first panel with respect to the support, and said first panel (30,32) is an acoustic panel or a non-acoustic panel, and the assembly further comprises a second panel (32,30):

which is an acoustic panel (30) if the first panel (32) is non-acoustic, and vice-versa, and which, together with the support (38), is adapted to be received in the recess (34), instead of the first panel (30,32).

4. An assembly according to claim 3, in which said surface for contact with the moving air (21,28,45) (32a) of the first or second panel (30,32) is solid and has a roughness of less than 5 μm.

5. An assembly according to claim 4, in which the first or second panel (30,32) is of composite material, comprising a carbon matrix and a resin, or is made of sheet metal with which stiffeners are assembled, away from the surfaces for contact with moving air.

6. An assembly according to claim 4, in which the first or second panel (30,32) has a thickness of less than, or equal to 5 mm.

7. An assembly according to claim 4, in which, away from the surface for contact with the moving air (21,28,45):

the first or second panel (30,32) comprises a plate reinforced with stiffeners, on a side opposite to that on which the surface for contact with the moving air is located, the stiffeners extend into a volume contained within the overall dimensions of the removable connecting elements (58).

8. An assembly according to claim 3, in which the first or second panel (30,32) is of composite material, comprising a carbon matrix and a resin, or is made of sheet metal with which stiffeners are assembled, away from the surfaces for contact with moving air.

9. An assembly according to claim 8, in which the first or second panel (30,32) has a thickness of less than, or equal to 5 mm.

10. An assembly according to claim 3, in which the first or second panel (30,32) has a thickness of less than, or equal to 5 mm.

11. An assembly according to claim 3, in which, away from the surface for contact with the moving air (21,28,45):

the first or second panel (30,32) comprises a plate reinforced with stiffeners, on a side opposite to that on which the surface for contact with the moving air is located, the stiffeners extend into a volume contained within the overall dimensions of the removable connecting elements (58).

12. An assembly according to claim 3, in which:

the first or second panel (30,32) comprises a plate, away from the surface for contact with the moving air (21,28,45), reinforced by stiffeners, and transversely to its surface for contact with the moving air (21,28,45), the first or second panel (30,32), comprising the plate, the stiffeners and the removable connecting elements (58), has a total thickness of less than or equal to 80 mm.

13. An assembly according to claim 3, in which:

the first or second panel (30,32) comprise a plate, away from the surface for contact with the moving air (21,28,45), reinforced by stiffeners, and transversely to their surfaces for contact with moving air, the recess (34) and the first or second panel (20,30,32), which comprise the plate, the stiffeners and the removable connecting elements (58), have total thicknesses less than or equal to 100 mm.

14. An assembly according to claim 3 in which the surface of the first or second panel (30,32) adapted for contact with the moving air (21,28,45) is curved centrally with respect to its periphery and peripherally has a slope for linking with the surrounding general surface (36) of said support, when the first or second panel is received in the recess (34).

15. An assembly according to claim 3, in which the first or second panel is formed of a plurality of sub-panels which, together; occupy the space of the recess, once placed inside.

* * * * *